No. 784,852. PATENTED MAR. 14, 1905.
C. P. GOERZ.
PANORAMA TELESCOPE.
APPLICATION FILED AUG. 4, 1902.

3 SHEETS—SHEET 1.

Witnesses:

Inventor.
Carl Paul Goerz
by his Attorney.

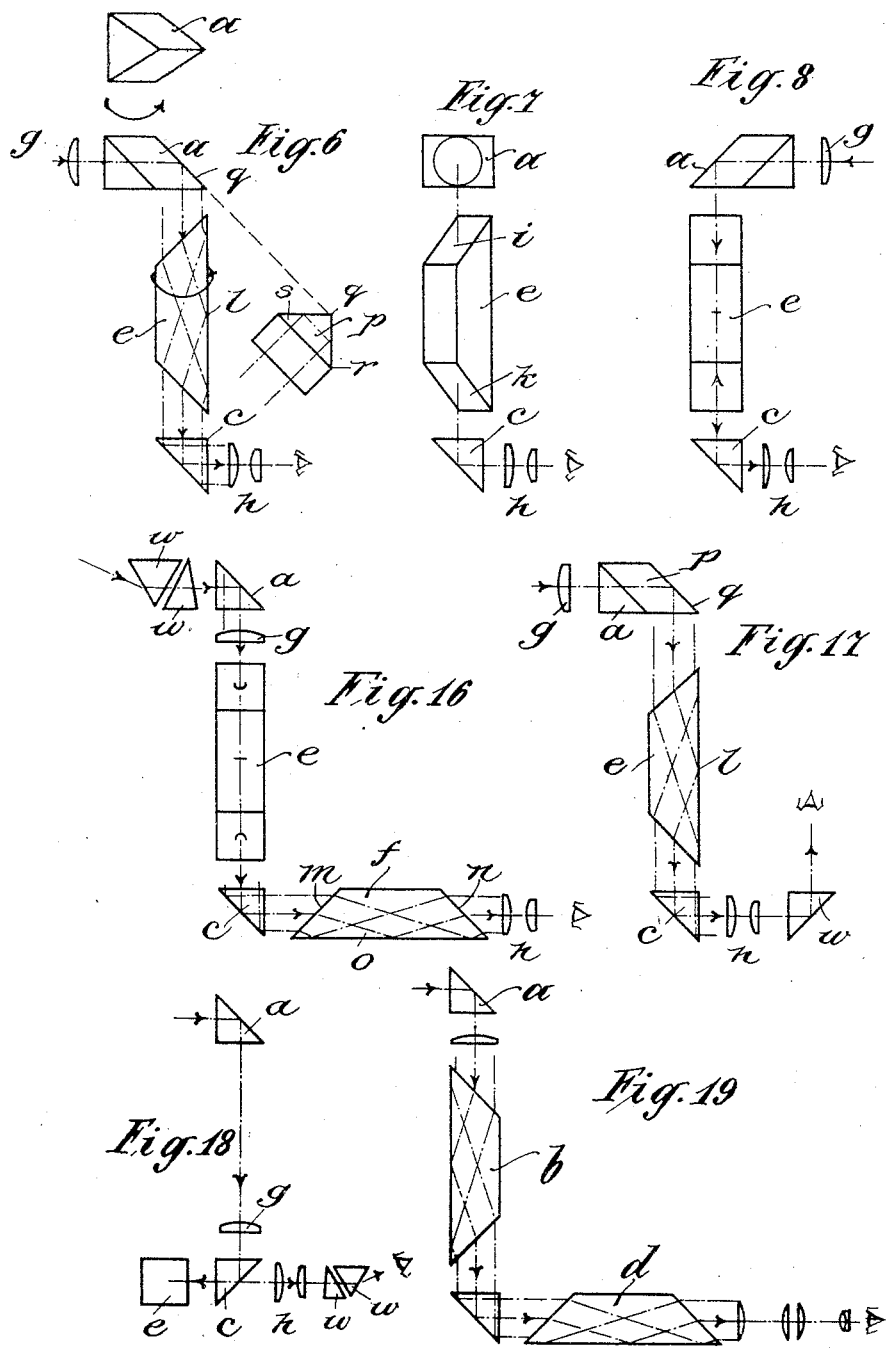

No. 784,852. PATENTED MAR. 14, 1905.
C. P. GOERZ.
PANORAMA TELESCOPE.
APPLICATION FILED AUG. 4, 1902.
3 SHEETS—SHEET 3.
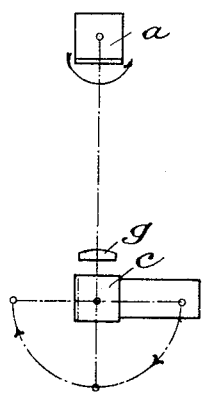
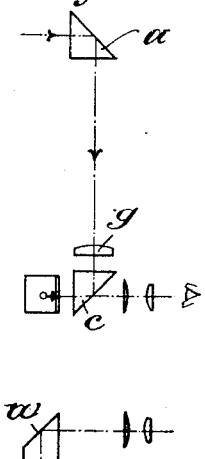
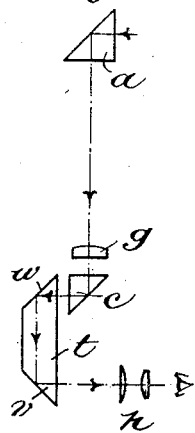
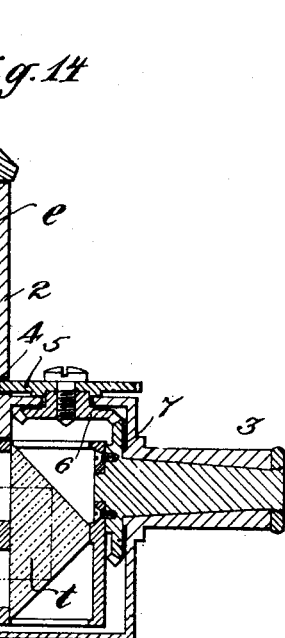
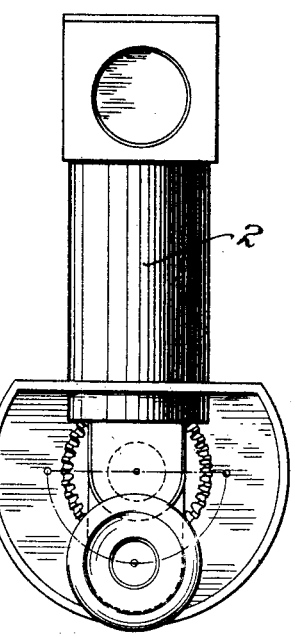
Witnesses:
Inventor:
Carl Paul Goerz
by
Attorney No. 784,852. Patented March 14, 1905.

UNITED STATES PATENT OFFICE.

CARL PAUL GOERZ, OF FRIEDENAU, GERMANY, ASSIGNOR TO THE FIRM OF OPTISCHE ANSTALT C. P. GOERZ AKTIENGESELLSCHAFT, OF FRIEDENAU, GERMANY.

PANORAMA-TELESCOPE.

SPECIFICATION forming part of Letters Patent No. 784,852, dated March 14, 1905.

Application filed August 4, 1902. Serial No. 118,238.

*To all whom it may concern:*

Be it known that I, CARL PAUL GOERZ, a citizen of the Kingdom of Prussia, and a resident of Friedenau, near Berlin, Germany, (whose post-office address is Rheinstrasse 45-46,) have invented certain new and useful Improvements in Panorama-Telescopes, of which the following is a specification.

The present invention relates to a telescope provided with a rotatable reflector for the incident-rays, so that the entire horizon can be "swept" by rotating the said reflector without it being necessary to direct the optical axis of the eye-lens toward the various points observed. In order to obtain erect images in spite of the reflection of the incident-rays by the said rotatable reflector, there is arranged in the path of the rays a system of reflecting-surfaces, preferably a system of prisms with reflecting-surfaces. In this system at least one reflector-surface is rotatable about an axis which is parallel with the direction of the axial ray in the air-space immediately before said ray strikes the reflector.

Figure 1:
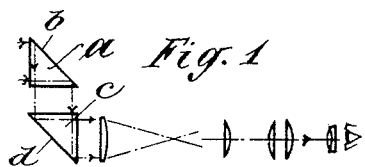
Figure 2:
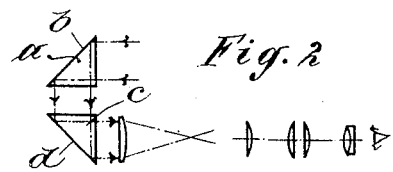
Figure 3:
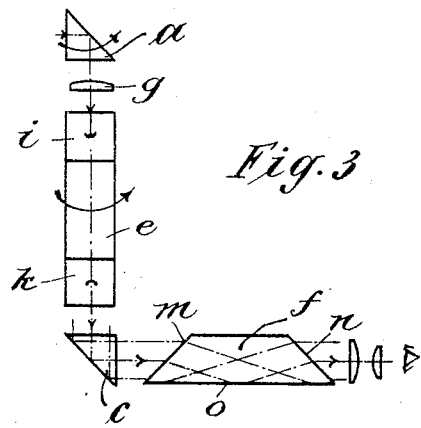
Figure 4:
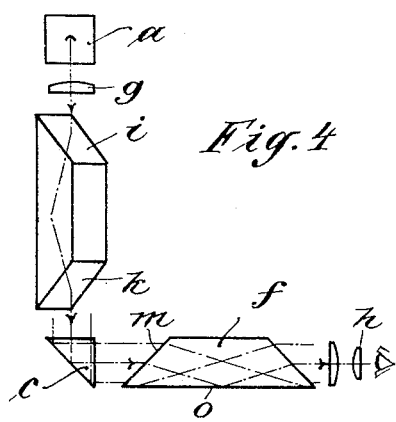
Figure 5:
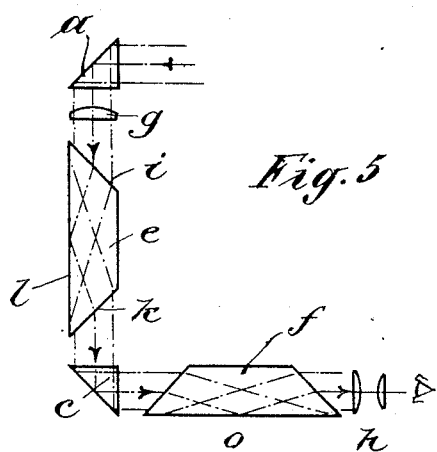

In the annexed drawings, Figures 1 and 2 illustrate the reversal of the image in a telescope with a rotatable reflector for the incident-rays, which may be called "objective-reflector," when the reflector is rotated through one hundred and eighty degrees. Figs. 3 to 5 show a system of three prisms inserted in the path of the rays coming from the rotatable reflector sweeping the horizon, one of said prisms, the erecting-prism, being rotatable and shown in the three figures in three positions, each being turned forty-five degrees from the position of the preceding figure, said three figures of the erecting-prism corresponding to three positions of the rotatable reflector sweeping the horizon, each being turned ninety degrees from the position of the preceding figure. Figs. 6 to 8 show a system of two prisms inserted in the path of the rays coming from the rotatable reflector sweeping the horizon, one of said prisms, the erecting-prism, being rotatable and shown in the different figures in three positions, each being turned forty-five degrees from the position of the preceding figure. The rotatable reflector sweeping the horizon has in this case the form of a dihedral prism, which receives and laterally reverses the rays. Figs. 9 to 13 show a reflector system inserted in the path of the rays coming from the reflector sweeping the horizon, said reflecting system corresponding, essentially, to the so-called "Parro" system, one of the prisms, the erecting-prism, being rotatable and shown, like the rotatable prism, sweeping the horizon in different positions. Figs. 14 and 15 represent a prism-telescope as per present invention in longitudinal section and side view, respectively. Fig. 16 shows substantially the same arrangement of prisms that is shown in Figs. 3 to 5 with the addition of certain prisms inserted into the path of the rays before these meet the rotatable reflector sweeping the horizon. Fig. 17 shows substantially the same arrangement of prisms as Figs. 6 to 8 with the additional prism behind the eye-lens. Figs. 18 and 19 show one form of a prism-telescope provided with a rotatable objective-reflector in which one of the prisms ordinarily belonging to this kind of telescope is connected to the rotatable objective-reflector for the purpose of correcting the inclined position into which the image is thrown by the rotation of the reflector.

In all the figures the rotatable objective-reflector is formed by the reflecting-surface $b$ of a rotatable prism $a$. In the arrangement diagrammatically shown in Figs. 1 and 2 the incident-rays are so reflected by the reflector-surface $b$ that they pass without refraction into a fixed prism $c$, by the reflecting-surface $d$ of which they are reflected in the direction of the optical axis of the telescope. In Fig. 2 the prism $a$ is shown rotated through one hundred and eighty degrees from the position shown in Fig. 1. As shown in the drawings, this rotation through one hundred and eighty degrees causes the image to be reversed. If the angle of rotation is smaller, an inclined image will be obtained. The object of the present invention is to correct the reversed or inclined position of the image by a suitable arrangement of prisms. With the reversal of the image by the rotation of the reflector through one hundred and eighty degrees an inversion takes place, so that that which is in reality to the right of any point of the object viewed appears in the image to be on the left, and vice versa.

In the arrangement of prisms shown in Figs. 3 to 5 in various positions two prisms $e f$ are placed in the path of the incident-rays, the former prism being situated between the objective-lens $g$ and the fixed prism $c$ and the latter between the fixed prism $c$ and the eye-lens $h$. Each of these two prisms $e f$ possesses two refracting-surfaces $i k$ and $m n$, respectively, and one reflecting-surface $l$ and $o$, respectively. By the refractive and reflective action of these prisms the rays are caused to leave the latter in a direction essentially parallel to that in which they entered the telescope. The prism $e$ is rotatable with half the angular speed of the objective-reflector $a$ about an axis parallel to the direction of the axial ray in the air-space immediately before meeting the prism, and by this means an erect image is obtained. This correction by the prism $e$ is, however, only partial. It corrects the reversal of the image caused by the rotation of the objective-reflector and at the same time corrects the lateral inversion of the image thrown by the objective. The inversion of the image from top to bottom caused by the objective is, however, not removed by the rotary prism $e$, but by the fixed prism $f$.

In the arrangement shown in Figs. 6 to 8 the fixed prism $f$ is dispensed with, the arrangement of the rotatable prism $e$ being the same as shown in Figs. 3 to 5. In order to obtain erect vertical and true lateral images in the absence of the prism $f$, the rotary prism $a$ is a dihedral prism—that is to say, a roof-shaped prism $p$ is fixed to the surface $b$. (Shown in Figs. 1 to 5.) The edge $q$ of this prism $p$ is perpendicular to the direction of the edge of the base-prism $a$. The dihedral projection $p$ is of course preferably made of one piece with the prism $a$. The reflection of the entering rays by the two surfaces $r s$ of the dihedral projection thus corrects the inversion of the sides of the image before an erect image is obtained by the reflective action of the surface $l$ of the rotatable prism $a$. In this case the reflection by the surface $l$ of the rotatory prism corrects the inversion of top and bottom caused by the objective. This is due to the fact that the prism is assumed to have been rotated through an angle of ninety degrees from the position shown in Figs. 3 to 5. The rotary objective-reflector prism $a p$ is here assumed to be behind the objective and rotatable with the latter. The dihedral prism can of course also be arranged in front of the eye-lens, and the objective-reflector prism can consist of an ordinary rectangular prism, as shown in Figs. 3 to 5. Likewise the objective may be arranged behind the rotatable erecting-prism $e$, which in some instances may be advantageous in order to avoid astigmatism of the images.

In both arrangements described, and illustrated in Figs. 3 to 5 and Figs. 6 to 8, respectively, the eye-lens remains perfectly stationary during the rotation of the objective-reflector.

In the arrangement shown in Figs. 9 to 13 the rotatable objective-reflector is of the shape represented in Figs. 1 to 5. The objective $g$ is situated between the rotatable prism $a$ and the fixed prism $c$. The rays reflected by the surface $d$ of prism $c$ fall without refraction into the prism $t$, in which they are reflected twice by the surfaces $u$ an $v$, whereupon they pass out of the prism parallel to themselves, but in the opposite direction. In this case the functions of the two prisms $c f$, Figs. 3 to 5, and $p l$, Figs. 6 to 8, are performed by the one prism $t$, which is turned with half the angular speed of the objective-reflector, the eye-lens $h$ being at the same time rotated, with parallel displacement of its optical axis, as indicated in the drawings.

Under certain circumstances it is desirable not to allow the entering main ray at the rotation of the objective to describe a plane, but a conical surface or on emergency to give it an optical angle of inclination in the direction of its incidence. This can be effected by arranging a suitable prism or prisms $w$ in front of the objective or eye lens and as shown in the examples represented in Figs. 16 to 18.

Fig. 19 shows how it is also possible to give the added prism only the one function to prevent the rotation of the picture in the focal plane and effect the reversal by a terrestrical eye-lens. The principles mentioned above can of course also be applied to double telescopes.

Figs. 14 and 15 represent a prism-telescope as per present invention, in which the arrangement of the prisms is substantially that known as the "Porro." The objective-reflector prism is again indicated by $a$. Of the two remaining prisms of the telescope one corresponds with the fixed prism $c$ shown in the previous figures, and therefore indicated by the same letter. The second prism corresponds with the prism $t$ of the arrangement shown in Figs. 9 to 13, and is therefore indicated by the same letter.

The objective-lens $g$ is fixed in a tube 1, adapted to revolve in a sleeve 2. The tube 1 carries at its end the objective-prism $a$. From the reflecting plane of this latter the incident-rays are thrown onto the reflecting-surface of the fixed prism $c$, which reflects them to the prism $t$, in which the rays are twice rectangularly deflected and thrown to the ocular. The part which carries the prism $t$ and the ocular tube is fixedly connected with a rotatable pivot 3 in the case. Fixed to the objective-tube 1 is a toothed wheel 4, adapted to rotate the toothed wheel 7 on the pivot 3 by means of the toothed wheel 5 and pinion 6. The ratio of the gear-wheels is so selected that in equal periods the wheel 7 rotates through angles half as large as those described by the wheel 4. The above-described arrangements of prisms can of course also be used in double telescopes with rotatable object-reflectors.

The field of application for the above-described telescopes is a very wide one. They can, for example, be used with advantage at points of observation where only a limited space is available for the erection of the apparatus. They can also serve as watch-telescopes on armor-turrets, conning-towers, the bridges of ships, and more particularly on submarine boats or other protected points and also guns and the like.

Having now particularly described and ascertained the nature of my said invention and in what manner the same is to be performed, I declare that what I claim is—

1. In a telescope, the combination with an objective and an ocular, of a system of reflectors inserted in the path of the rays and inclined to same, one of the reflectors being rotatably mounted and inclined to its axis of rotation and at least one further erecting-reflector being rotatably mounted about an axis parallel or essentially coincident with the direction of the axial ray, where it passes through the air-space before meeting the said reflector, substantially as and for the purposes described.

2. In a telescope, the combination with an objective and an ocular, of a pivotally-arranged reflector inserted in the path of the rays and inclined to same so as to sweep the horizon on rotation, an erecting-prism pivotally arranged on an axis essentially coincident with the axial ray, in the air-space traversed by it immediately before its meeting the prism, said prism having at least one reflecting-surface adapted to reflect the rays before leaving the prism, substantially as and for the purposes set forth.

3. In a telescope, the combination with an objective and an ocular, of a system of prisms adapted to eliminate the reversion of images produced by the objective, two prisms of said system, with at least two reflecting-surfaces, being pivotally arranged, one of same adapted to sweep the horizon on rotation and the other having an axis of rotation essentially coincident with the axial ray in the air-space immediately before its meeting the prism, substantially as and for the purposes set forth.

4. In a telescope, the combination with an objective and an ocular, of a system of reflectors inserted in the path of the rays and inclined to same, one of the reflectors being rotatably mounted and inclined to its axis of rotation and at least one further erecting-reflector being rotatably mounted about an axis parallel or essentially coincident with the direction of the axial ray, where it passes through the air-space before meeting the said reflector, the said two pivotable reflectors being coupled with one another, the ratio of gearing being such that the angular speed of the erecting-reflector is half as great as that of the other pivotable reflector, substantially as and for the purposes set forth.

In testimony whereof I affix my signature in presence of two witnesses.

CARL PAUL GOERZ.

Witnesses:
  WOLDEMAR HAUPT,
  HENRY HASPER.